(12) United States Patent
Azam et al.

(10) Patent No.: US 11,773,628 B2
(45) Date of Patent: Oct. 3, 2023

(54) HOOK WITH LOCK

(71) Applicant: Hewlett-Packard Development Company, L.P., Spring, TX (US)

(72) Inventors: Syed S. Azam, Spring, TX (US); Dimitre D. Mehandjiysky, Spring, TX (US); Alexander Williams, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 569 days.

(21) Appl. No.: 17/045,505

(22) PCT Filed: Feb. 28, 2019

(86) PCT No.: PCT/US2019/020094
§ 371 (c)(1),
(2) Date: Oct. 6, 2020

(87) PCT Pub. No.: WO2020/176108
PCT Pub. Date: Sep. 3, 2020

(65) Prior Publication Data
US 2021/0404221 A1    Dec. 30, 2021

(51) Int. Cl.
*E05B 73/00* (2006.01)
*A47F 5/00* (2006.01)
(Continued)

(52) U.S. Cl.
CPC ............ *E05B 73/00* (2013.01); *A47F 5/0006* (2013.01); *G06F 1/1601* (2013.01); *G06F 21/31* (2013.01);
(Continued)

(58) Field of Classification Search
CPC ................... E05B 73/00; G06F 1/1601; G06F 2221/2111; G06F 21/31; G06F 21/88; A47F 5/0006
(Continued)

(56) References Cited

U.S. PATENT DOCUMENTS 8,593,573 B2 * 11/2013 Price ...................... H04N 21/41
348/553
9,917,455 B1 * 3/2018 Shipman ............... H02J 7/0044
(Continued)

FOREIGN PATENT DOCUMENTS

CN          103206121          7/2013
CN          204087053 U        1/2015
(Continued)

*Primary Examiner* — Todd M Epps
(74) *Attorney, Agent, or Firm* — QUARLES & BRADY LLP

(57) ABSTRACT

In an example, an example hook includes a rest surface to sustain a peripheral, a retainment device switchable between a lock position and an unlock position, a lock coupleable to the retainment device to maintain the retainment device in the lock position, and a controller to actuate the lock in response to a user event. In another example, an example display device includes a housing, a hook coupled to the side wall of the housing, a retainment device coupleable to the hook, a lock to maintain the retainment device in a lock position or in an unlocked position; and a controller to activate the lock in response to a signal corresponding to an instruction to lock the retainment device and deactivate the lock in response to a signal corresponding to an instruction to unlock the retainment device based on a user event.

15 Claims, 9 Drawing Sheets

(51) Int. Cl.
*G06F 1/16* (2006.01)
*G06F 21/31* (2013.01)
*G06F 21/88* (2013.01)

(52) U.S. Cl.
CPC ...... *G06F 21/88* (2013.01); *G06F 2221/2111* (2013.01)

(58) Field of Classification Search
USPC ........................................................ 248/551
See application file for complete search history.

(56) References Cited

U.S. PATENT DOCUMENTS

| | | | |
|---|---|---|---|
| 2015/0293563 A1* | 10/2015 | Wharrad | G06F 1/1632 726/20 |
| 2017/0356218 A1 | 12/2017 | Beasley et al. | |
| 2018/0091885 A1 | 3/2018 | Carter | |
| 2018/0146561 A1* | 5/2018 | Huang | H05K 5/03 |
| 2022/0225007 A1* | 7/2022 | Mehandjiysky | H04R 5/0335 |

FOREIGN PATENT DOCUMENTS

| | | |
|---|---|---|
| CN | 105914843 | 8/2016 |
| CN | 104554535 B | 3/2017 |
| TW | M397466 U | 2/2011 |

* cited by examiner

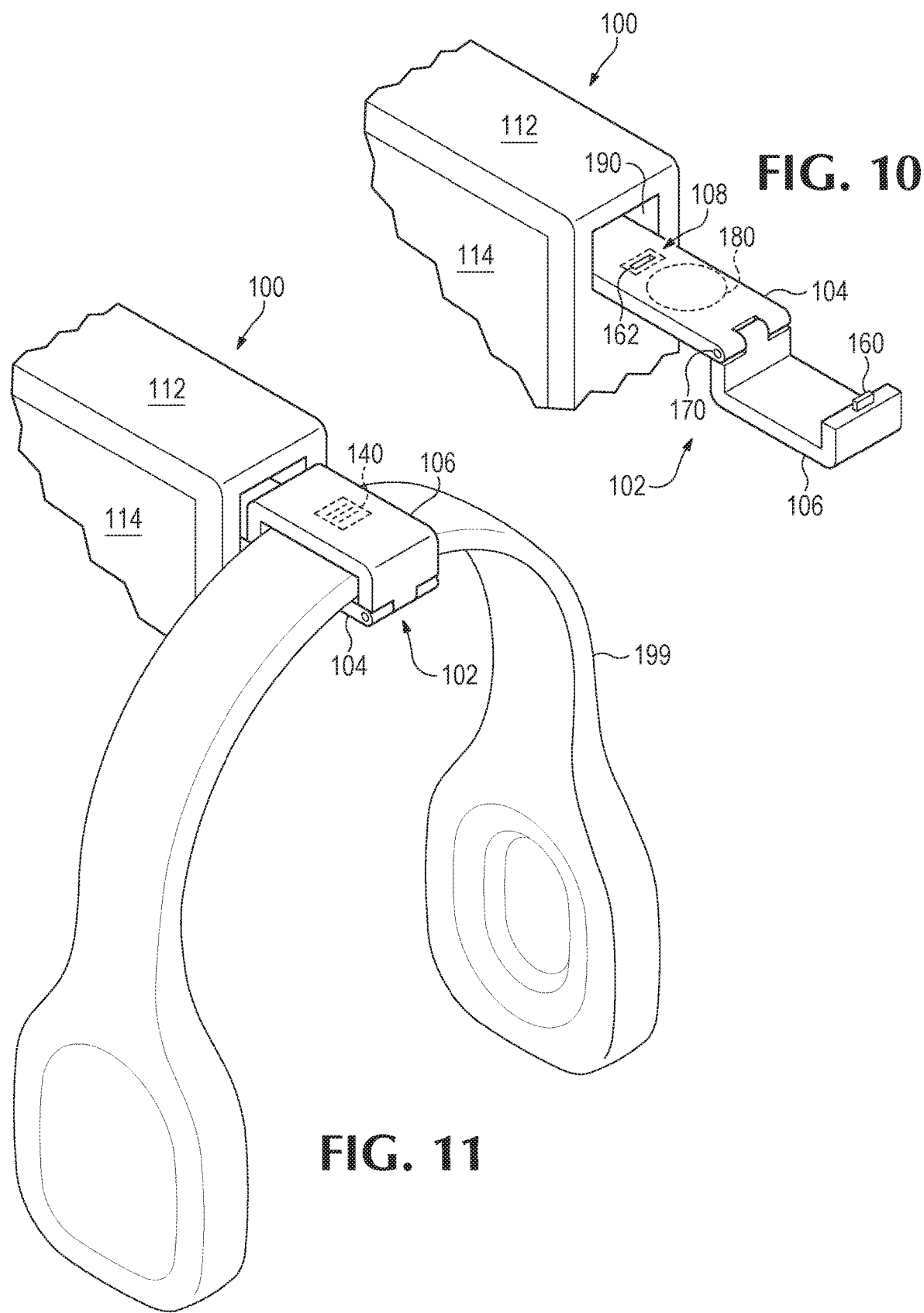

HOOK WITH LOCK

BACKGROUND

Peripherals are commonly used with computers. For example, a desktop computer device may utilize a number of human interface devices, such as a mouse, a keyboard, a camera, a printer, headphones, and the like. Some peripherals, when not in use, may be stored on the same surface of the computer device (such as a desk top), on a separate surface (such as a shelf), or in a container (such as a drawer).

BRIEF DESCRIPTION OF THE DRAWINGS

FIGS. 10-11 are isometric views of an example protractible hook having an example lock in various states of operation.

DETAILED DESCRIPTION

In the following description and figures, some example implementations of display devices having a peripheral lock, all-in-one computer systems having a hook, and/or methods of operating a lock are described. As used herein, a display device is an apparatus having a display for producing images. Example display devices include a monitor, a television, and a mobile device, such as a tablet. An all-in-one computer system, as used herein, represents a computer system that includes a display device and a computer system with computing resources to execute an operating system. Example all-in-one systems may be a desktop computer with an integrated screen or a laptop computer.

Computer systems, such as all-in-one computer systems, may include ports to attach peripherals which allow for providing additional computing features or for enhancing the user experience of the computer system. An example peripheral is a headphone device. As used herein, a headphone device represents an electronic device with at least one speaker coupled to a support formed to be wearable on at least a portion of a head of a human being. Example headphone devices may surround the outside of the ear, rest on the ear, or fit inside the ear canal. Example headphone devices may be wired or wirelessly operable. Example headphone devices may include over-the-ear headphones, a single speaker headset with a microphone, in-ear earphones, a virtual reality headset, and the like.

When not in use, such peripherals may generally be stored on a surface, such as a desk surface, or in a container, such as a desk drawer. A user may connect the peripheral to computer system for each intended use, remove the peripheral after use, and stow the peripheral away when not being used for an extended period of time. In some examples, a headset may be left on the desk when not in use. In such a state, the headset may be susceptible to theft or misuse. Some peripherals may be powered wirelessly or communicate wirelessly. Peripherals with wireless capabilities may have a likelihood of unauthorized use or being stolen because the wireless peripheral may not be physically connected to the host device.

To improve security, for example, a lock may be used to secure headphones when not in use. Various examples described below relate to a display device having a securable lock for a peripheral. A headphone hook is described herein with a lock to secure the headphones to the hook. In some examples, biometrics are used to determine authorized use of the peripheral and unlock the peripheral from the hook. In this manner, the peripheral may be secured from unauthorized use.

Figure 1:
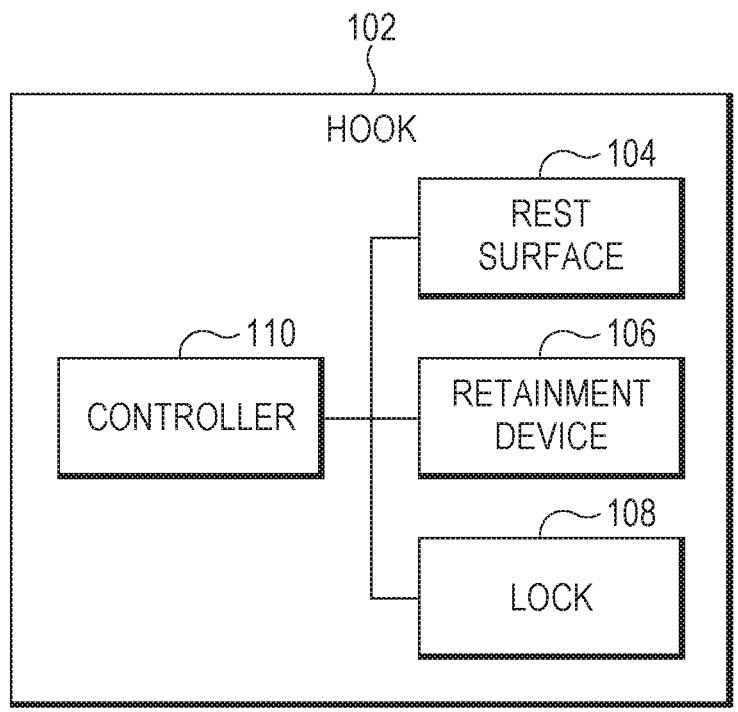
FIGS. 1-2 are block diagrams depicting example headphone hooks.
Figure 2:
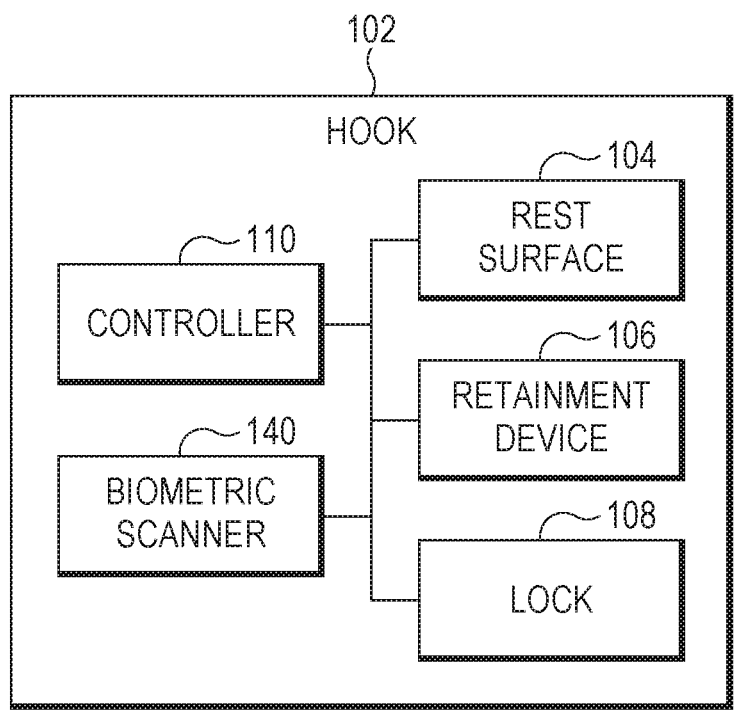

FIGS. 1-2 are block diagrams depicting example headphone hooks 102. A hook represents a prop having a curved or angular piece of a supportive substance for holding or suspending something, such as a headset. For example, the hook 102 may include a curved pole or a substantially flat resting surface (such as a tray) with a lip at a substantially perpendicular angle to act as a backstop to cradle a headphone device in place. The hook may be a cantilever having a free end for placing a headphone device upon and fixed end coupled to a support to sustain the weight of the headphone device with or without a brace.

Referring to FIG. 1, the example headphone hook 102 of FIG. 1 generally includes a rest surface 104, a retainment device 106, a lock member 108, and a controller 110. In general, the controller 110 causes the lock 108 to secure the retainment device 106 in a locked position, such as covering the rest surface 104 of the hook 102 and securing an item towards the rest surface 104.

The rest surface 104 is capable of sustaining a peripheral, such as headphones or another accessory. The rest surface may be substantially flat, curved, angular, textured, smooth, or any other attribute corresponding to a type of peripheral to be placed on the hook 102. For example, the rest surface may include a holding area with a cushion layer to securely sustain a head strap of a headset and protect the head strap while sustained by the hook.

The retainment device 106 is a mechanical structure to retain the peripheral on the rest surface 104. The retainment device 106 is switchable between a lock position that restrains the peripheral to a location of the rest surface and an unlock position that reduces an orientation restriction on the peripheral with respect to the lock position. The retainment device 106 may generate a boundary limitation by changing orientation, flexibility, connection, or magnitude of strength. For example, a physical lock may limit the moveable bounds in space by placing the keeping the retainment device in the physical path of removal of the peripheral. For another example, an electromagnetic lock may restrain the moveable bounds in space by changing the magnetic force to increase or decrease the attractive pull between the source and the peripheral.

The lock 108 may be coupleable to the retainment device 106. The lock 108 may be a physical structure and may include circuitry to assist changes to the retainment device 106. For example, the lock 108 may activate and/or maintain the retainment device 106 in a lock state. A lock state may be an orientation of the retainment device 106 or an attribute of the lock 108, such as in the example of an electromagnetic lock.

The controller 110 may actuate the lock 108 in response to a user event. A user event represents a software event activated by a user or a physical action performed by a user. An example software event may be a software interrupt, a timer, an application notification, or other software state representable by an instruction or a signal. An authorized user event represents a user event performed by a user that is authorized by a system associated with the lock 108. For example, an authorized user event may be a software event resulting from interaction of an authorized user with the system. The controller 110 represents a processor resource and a machine-readable medium having a control program stored thereon. The control program, when executed by the processor resource, causes the controller 110 to operate according to the control program. For example, the controller 110 may execute instructions that cause the controller 110 to activate a protractible element to a protracted position or the retracted position (e.g., based on a button depression or based on location data provided by a biometric scanner and/or a proximity sensor corresponding to an authorized user). For another example, the controller 110 may execute instructions that cause the controller 110 to identify a match between received data and a user profile and activate the lock 108 when the retainment device 106 is in a protracted position (e.g., the retainment device is in a lock position). For yet another example, the control program may be executed to cause the controller 110 to activate the lock 108 in response to a signal corresponding to an instruction to lock the retainment device 106 and deactivate the lock 108 in response to a signal corresponding to an instruction to unlock the retainment device 106 based on an authorized user event. The controller 110 may be pairable with a wirelessly operable device, such as via a personal area network communication method.

Referring to FIG. 2, the hook 102 includes the same elements as the hook 102 of FIG. 1 and includes a biometric scanner 140 coupled to the controller 110. The controller 110 deactivates the lock 108 when data generated by the biometric scanner 140 matches data corresponding to an authorized user.

As used herein, a biometric scanner 140 is a device that generates data corresponding to biometric input. A biometric scanner 140 may be a security identification and authentication device that performs identification and/or authentication using biometric data. The biometric scanner 140 may include a sensor and/or camera to generate information, such as a fingerprint scanner or video camera, and may include circuitry to analyze the generated information, such as a controller to perform image processing on a video stream generated from a camera. For example, the biometric scanner 140 may verify or recognize the identity of a person based on physiological or behavioral characteristics, such as fingerprints, facial images, iris recognition, and/or voice recognition. Example categories of biometric data may include data representing chemical information, visual information, behavioral information, olfactory information, and auditory information. In an example where a user profile may include a dataset corresponding to a unique combination of the biometric data (e.g., the biometric data of the user profile corresponds to biometric information associated with a user), the biometric scanner 140 may generate data based on user input (touch input, visual input, chemical input, etc.), compare the generated data to a number of user profiles, and match the generated data to a combination of biometric data corresponding to a unique user profile.

In an example, the biometric scanner 140 may be located on a retainment device 106 that generally covers a substantially rectangular rest surface 104. In that example, the retainment device 106 may be a U-shaped cover coupled to a hinge such that, when the cover is rotated to contact the rest surface 104, a through-hole exists between the cover and the rest surface 104. The through-hole is large enough that a portion of the peripheral fits in the through-hole, for example, the through-hole may be of a size through which the headband of a wirelessly operable headphone device may fit.

The retainment device 106 may include a tab coupleable to the lock 108. For example, the lock 108 may include a side wall forming an aperture into which the tab of the retainment device 106 resides when sufficient pressure is placed in a direction of the rest surface 104. In this manner, the lock 108 may couple the retainment device 106 to the rest surface 104 based on sufficient pressure placed on the retainment device 106 towards the rest surface 104. In that example, the controller 110 may cause the lock to release the tab from the aperture in the side wall, such as, in response to biometric feedback or a button being pressed.

The controller 110 may utilize data, such as biometric data, location data, timestamps, payment information, and the like, to operate the retainment device 106 and/or lock 108 to secure or unsecure a peripheral to the hook 102. As examples, the controller 110 may lock or unlock the lock 108 upon matching a user's identity to an authorized user profile, upon detecting an object in a proximity threshold range of the hook 102, upon reaching a specific time period, upon receiving credit card information, or some combination thereof.

Figure 3:
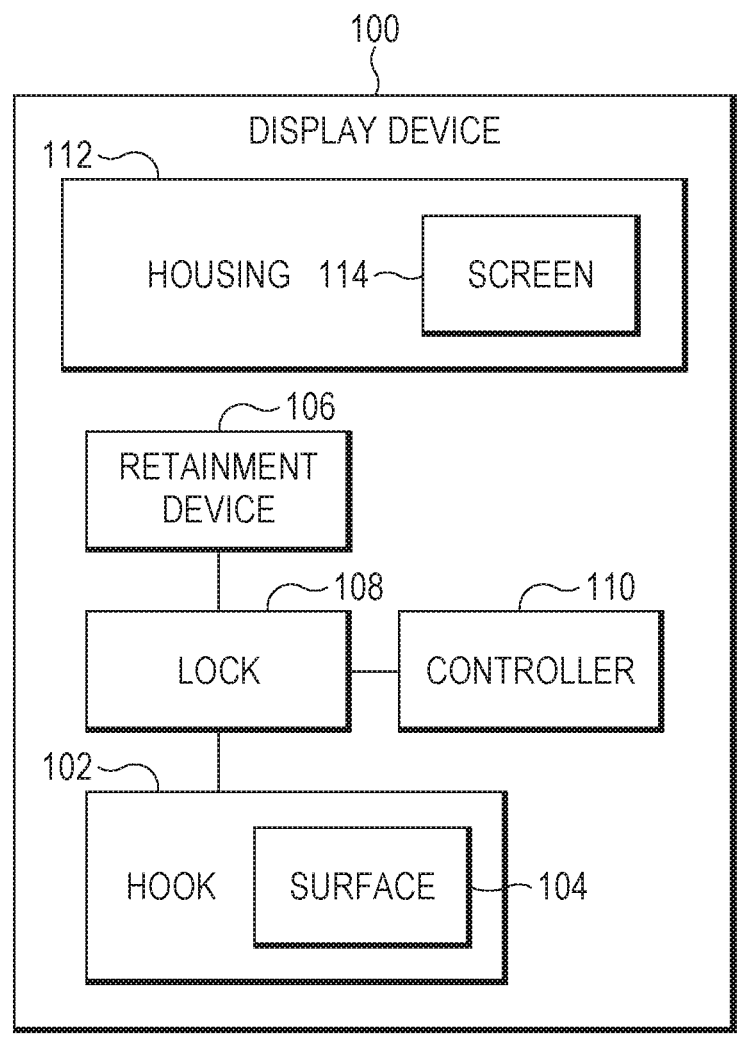
FIGS. 3-4 are block diagrams depicting example display devices.
Figure 4:
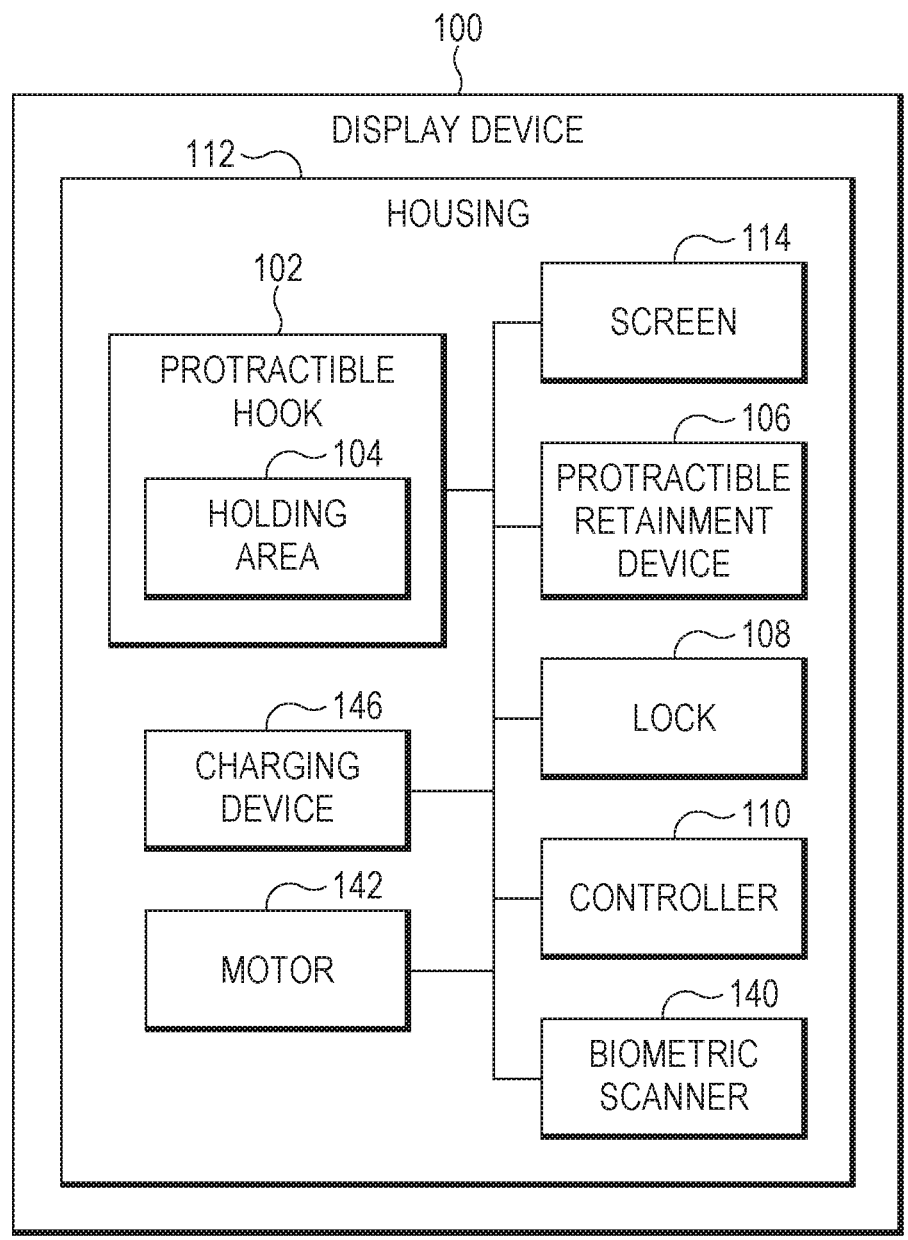

FIGS. 3-4 are block diagrams depicting example display devices 100. The example display device 100 of FIG. 3 includes a housing 112 around a screen 114, a hook 102 with a surface 104, a retainment device 106, a lock 108, and a controller 110. In an example, the housing 112 may include a side wall on which is located the hook 102. In other examples, the hook 102 may include a housing separate from the display housing 112.

Referring to FIG. 4, the display device 100 includes components similar to FIG. 3, where the hook and the retainment device are protractible. The example of FIG. 4 depicts the displays device 100 further includes a biometric scanner 140, a motor 142, and a charging device 146, and the components are located within the housing 112 of the display device 100. The lock 108 may sustain the retainment device 106 in an orientation that adjust the spatial bounds of the hook 102. For example, the controller 110 may control the retainment device to move over the surface 104 of the hook 102 and control the lock 108 to sustain in retainment device 106 in a position over the surface 114.

The protractible hook 106 may be a cantilever that is able to sustain a peripheral such as a headphone device. For example, the surface 104 of the protractible hook 102 may include a headphone receiving area that is curved or oblique with respect to screen 114 (or housing sidewall, etc.), such that the hook 102 protracts away from the display device. The retainment device 106 may move in a direction orthogonal to the direction of retraction and protraction of the hook 102.

The retainment device 106 is operatively coupled to the hook 102. For example, the retainment device 106 may include a protractible surface capable of covering or otherwise limiting a spatial bound corresponding to the surface 104 of the hook 102. The hook 102 may also be protractible from the housing 112. In that example, the retainment device 106 may deploy to a locked or unlocked position when the hook reaches a particular orientation, such as a protracted position. Further examples are described with reference to FIGS. 12-14.

The controller 110 may activate the lock 108 in response to a signal corresponding to an instruction to lock the retainment device and deactivate the lock 108 in response to a signal corresponding to an instruction to unlock the retainment device based on an authorized user event. Such signals may be received by the controller 110 as electrical signals and may be received from an operating system of a compute device, a biometric scanner, circuitry associated with a mechanical button or latch corresponding to the hook 102, and the like.

The charging device 146 may be coupled to the hook 102 and allow for a peripheral device to charge while sustained on the surface 104 of the protractible hook 102. For example, the charging device may include a port exposed from the hook 102 that is connectible to a port on a peripheral to provide power from the display device 100 to the peripheral. The charging device 146 may be activatable in response to contact between a lockable end of the retainment device 106 and a lockable portion of the hook 102, such as in the example where the lock is a physical structure that physically sustains the retainment device 106 at an orientation with respect to the protractible hook 102 and may physically couple a structure of the retainment device 106 to a structure of the hook 102.

A charging device 146 may be coupled to the protractible hook 102 to allow a peripheral, such as a headphone device to charge while sustained by the protractible hook 102. The charging device 146 represents an electronic device having a power source and capable of transferring power to a chargeable device. Charging devices may include charging via electrical connection or wireless charging. As examples, the charging device may charge via a direct electrical connection, via induction, via a near-field charging method, a far-field charging method, or the like.

The motor 142 may operate movement of a component of the display device 100. For example, the motor 142 may operate protraction and retraction of the retainment device 106 and/or the hook 102. The motor 142 operates based on signals received via the controller 102. For example, the retainment device 106 may be sustained, by the motor 142, in the lock position until a timer threshold is reached, the timer threshold corresponding to a time-based event associated with an authorized user.

The protractible hook 102 may move among a plurality of positions via an actuation mechanism capable of being activated to induce movement of the protractible hook 102. For example, the actuation member may include a spring-loaded ejection device or a motor. The actuation member provides controlled force to move the protractible hook 102 in a regulated manner. The actuation member may include a spring, a piston, a pump, a motor, and the like. The actuation member may include integrated or additional components to control the movement. The actuation member may move the protractible hook 102 between a retracted position within the housing 112 and a protracted position where the protractible hook 102 is positioned external to the housing 112. Thus, the protractible hook 102 is accessible to a user when in a protracted position and may not be accessible when in a retracted position. Controlled movement may include increasing speed, decreasing speed, movement at a steady rate, or stepped positioning. Examples of components that may be part of a speed control device include variable gear ratios, a stop, a wall having a particular friction property to control speed, a soft-open device, a soft-close device, a spring arm, a cam, a compressible foam or spring, a piston or other hydraulic mechanism, and the like.

Figure 5:
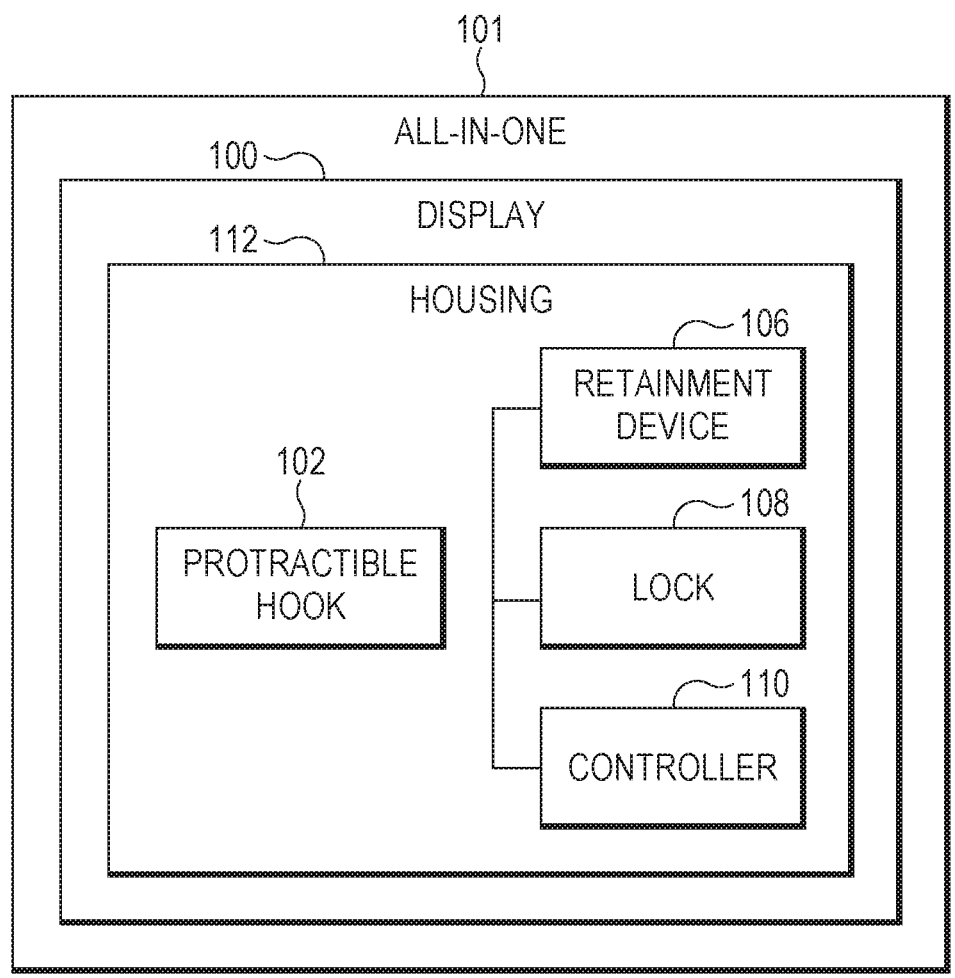
FIGS. 5-6 are block diagrams depicting example all-in-one computer devices.
Figure 6:
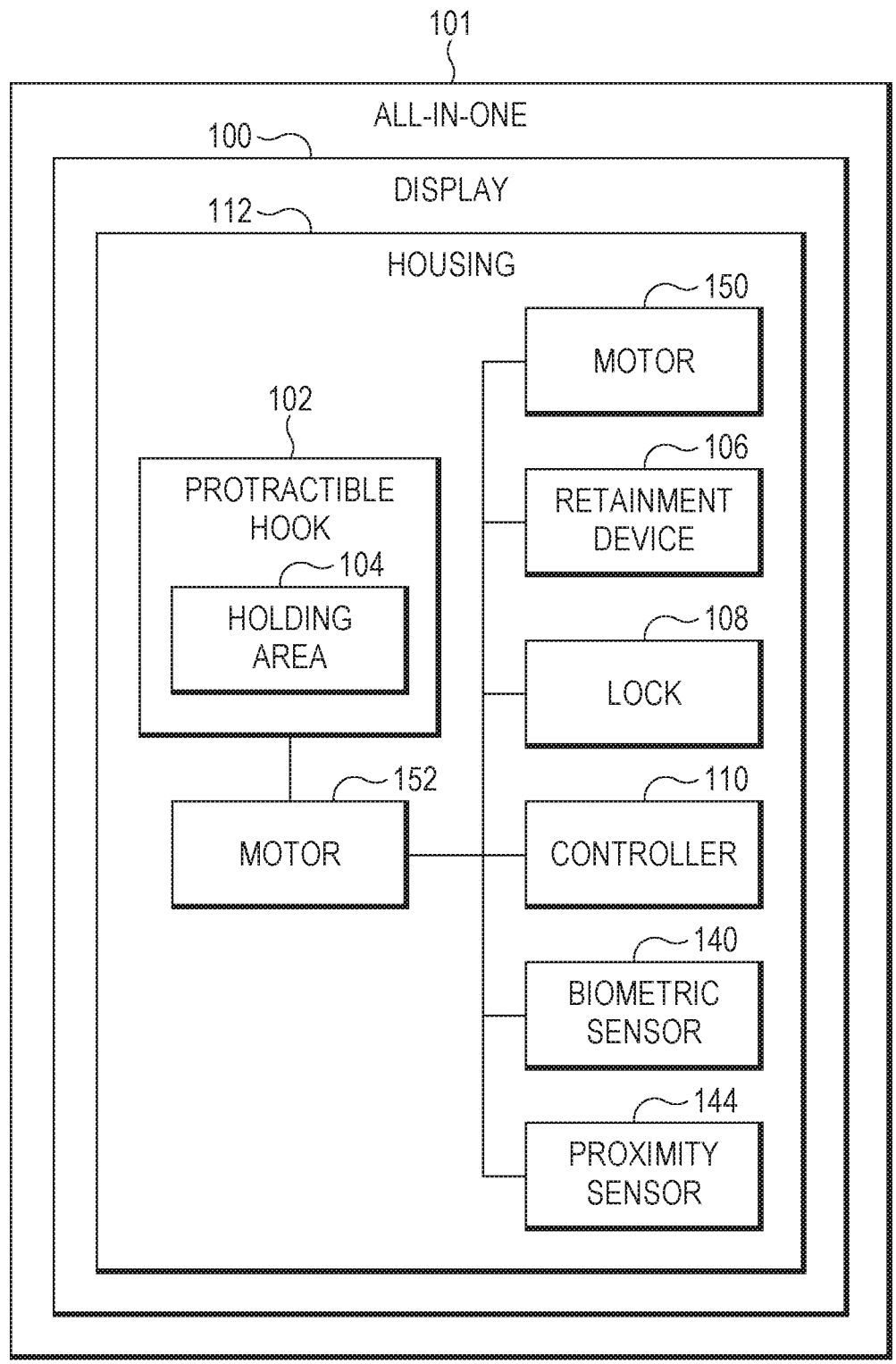

FIGS. 5-6 are block diagrams depicting example all-in-one computer devices 101. The example all-in-one computing devices 101 of FIGS. 5 and 6 generally include a display 100 integrated the all-in-one computer system, a housing 112, a protractible hook 102, a retainment device 106, a lock 108, and a controller 110. The example all-in-one computer device 101 of FIG. 6 also includes a motor 150 coupled to the retainment device 106, a motor 152 coupled to the hook 102, a biometric sensor 140 coupled to the controller 110, and a proximity sensor 144 coupled to the controller 110. Descriptions of components previously mentioned apply to the components of the all-in-one device 101 and are not repeated for brevity.

Referring to FIG. 5, the housing 112 may form a cavity capable of housing a protractible hook 102, and as such, the protractible hook 102 may be integrated into the housing component. The protractible hook 102 may be capable of supporting weight of a wirelessly operable device when the protractible hook 102 is in a protracted position. The retainment device 106 may be coupleable to the protractible hook 102. The retainment device 106 may include a physical structure to maintain the wirelessly operable device on the hook 102 when the retainment device 106 is in a first orientation. The lock 108 may be operably coupled to the retainment device to maintain the retainment device in the first orientation when the lock 108 is in an active state. The controller 110 controls the lock 108 to activate the lock when the protractible hook 102 is in the protracted position and the retainment device 106 is in the first orientation. The controller 110 controls the lock 108 to deactivate the lock 108 in response to an authentication signal corresponding to an authorized user event. The all-in-one computing device may include a combination of circuitry and executable instructions to execute an operating system. In such an example, the authentication signal may be received via an instruction from the operating system, a mobile application, or a peripheral coupled to the all-in-one computer system (such as a keyboard or a mouse with a fingerprint scanner).

Referring to FIG. 6, the all-in-one computing device 101 may include sensors, such as a biometric sensor 140 and a proximity sensor 144. The biometric sensor 140 (which may be part of a biometric scanner) may generate data based on biometric information. The controller 110 may, for example, analyze biometric data generated by the biometric sensor 140 and deactivate the lock 108 in response to identification of an authorized user by data of the biometric sensor 140.

The proximity sensor 144 is a sensor that generates location data. The proximity sensor 144 may detect an object, such as a user, within a proximity range of the hook 102 and send location data corresponding to the detected object to the controller 110. Upon receipt of the location data, the controller 110 may generate a signal to the lock 108 to unlock (or lock) the retainment device 106. The controller 110 may receive biometric data in a similar fashion from the biometric sensor and determine whether to lock or unlock the lock 108 using biometric data received from the biometric sensor. As discussed previously, such types of information may be used by the controller 110 to determine whether an authorized user event has occurred and perform a locking or unlocking operation accordingly, such as activate the lock 108 to sustain the retainment device 106 in a locked position or deactivating the lock 108 to release the retainment device 106 from the locked position to an unlocked position. For another example, the controller 110 may include a machine-medium having a control program stored thereon, the control program to, when executed by the controller, cause a motor to move the retainment device into a lock position or an unlock position based on the location data provided by the proximity sensor. For yet another example, the controller 110 may include instructions that cause the lock 108 to activate based upon location data identified by the proximity sensor 144 and an authorized user event.

In an example, the retainment device 106 may include a rotatable cap coupled to the hook 102 by a hinge at a first end of the rotatable cap. The lock 108 may also couple to a second end of the rotatable cap when the controller activates the lock 108. In that example, the biometric sensor 140 may be integrated in a biometric scanner accessible on an exterior of the retainment device when the retainment device is in a first orientation, such as depicted in FIG. 11. In some examples, the biometric scanner may be powered separately from the power provided to the all-in-one computer system and the retainment device 106 may cover a portion of the wirelessly operable device when in the first orientation.

Figure 7:
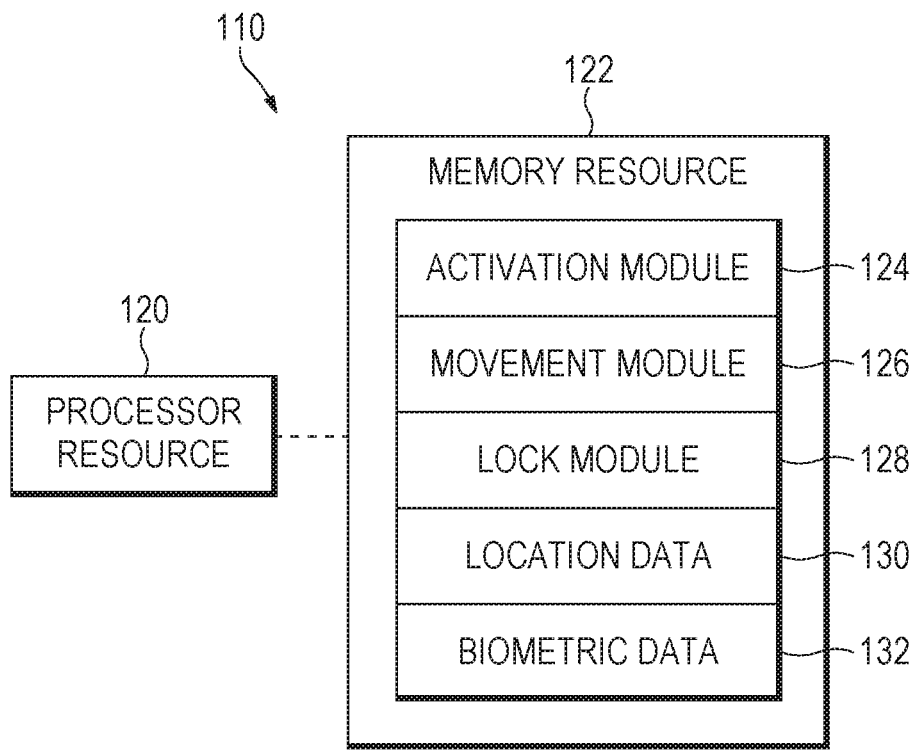
FIG. 7 is a block diagram depicting example components of a controller.

FIG. 7 is a block diagram depicting example components of a controller 110. The components of an example display device may include a protractible hook 102, a retainment device 106, a lock 108, motors 150 and 152, a biometric scanner 140, and a proximity sensor 144, where those display components may be coupled to the processor resource 120 of the controller 110 to coordinate operation of those components.

The controller 110 may include a memory resource 122. The memory resource 122 may contain data useable by the controller 110, such as location data 130 (e.g., provided from a proximity sensor) and biometric data 132 (e.g., provided from a biometric scanner). The memory resource 122 may contain a set of instructions that are executable by the processor resource 120. The set of instructions are operable to cause the processor resource 120 to perform operations of the display device when the set of instructions are executed by the processor resource 120. The set of instructions stored on the memory resource 122 may be represented as an activation module 124, a movement module 126, and a lock module 128. The activation module 124, the movement module 126, and the lock module 128 represent program instructions that when executed cause function of the retainment device 106, the lock 108, the biometric scanner 140, the motor 142, the charging device 146, and/or the proximity sensor 144. For example, the processor resource 120 may carry out a set of instructions corresponding to the activation module 124 to identify an authorized user event has occurred, carry out a set of instructions corresponding to the movement module 126 to move a retainment device into a lockable position, carry out a set of instructions corresponding to the lock module 128 to actuate the lock and lock the retainment device into place. The processor resource 120 may carry out a set of instructions to execute the modules 124, 126, 128, and/or any other appropriate operations associated with a display device or all-in-one computer device. The functions of the modules 124, 126, and 128 have been discussed as function of the components described herein. For example, the modules may be executed to operate a controller 110 to manage and coordinate the functions described with respect to the descriptions of FIGS. 1-6. For another example, the processor resource 120 may carry out a set of instructions to perform operations corresponding to the description of methods 800 and/or 900 of FIGS. 8 and 9 respectively.

Although these particular modules and various other modules are illustrated and discussed in relation to FIG. 7 and other example implementations, other combinations or sub-combinations of modules may be included within other implementations. Said differently, although the modules illustrated in FIG. 7 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

A processor resource is any appropriate circuitry capable of processing (e.g., computing) instructions, such as one or multiple processing elements capable of retrieving instructions from a memory resource and executing those instructions. For example, the processor resource 120 may be a central processing unit (CPU) that enables operation of a protractible hook and a charging device by fetching, decoding, and executing modules 124, 126, and 128. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by a display device. The medium is any non-transitory medium or combination of non-transitory media able to electronically store data, such as modules of a display device and/or data used by the display device. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of a display device, such as the display device 100 of FIG. 1. A memory resource may be integrated in the same device as a processor resource or it may be separate but accessible to that device and the processor resource. A memory resource may be distributed across devices.

In the discussion herein, the controller 110 has been described as circuitry or a combination of circuitry and executable instructions. Such components may be implemented in a number of fashions. Looking at FIG. 5, the executable instructions may be processor-executable instructions, such as program instructions, stored on the memory resource 122, which is a tangible, non-transitory computer-readable storage medium, and the circuitry may be electronic circuitry, such as processor resource 120, for executing those instructions. The instructions residing on a memory resource may comprise any set of instructions to be executed directly (such as machine code) or indirectly (such as a script) by a processor resource.

Figure 8:
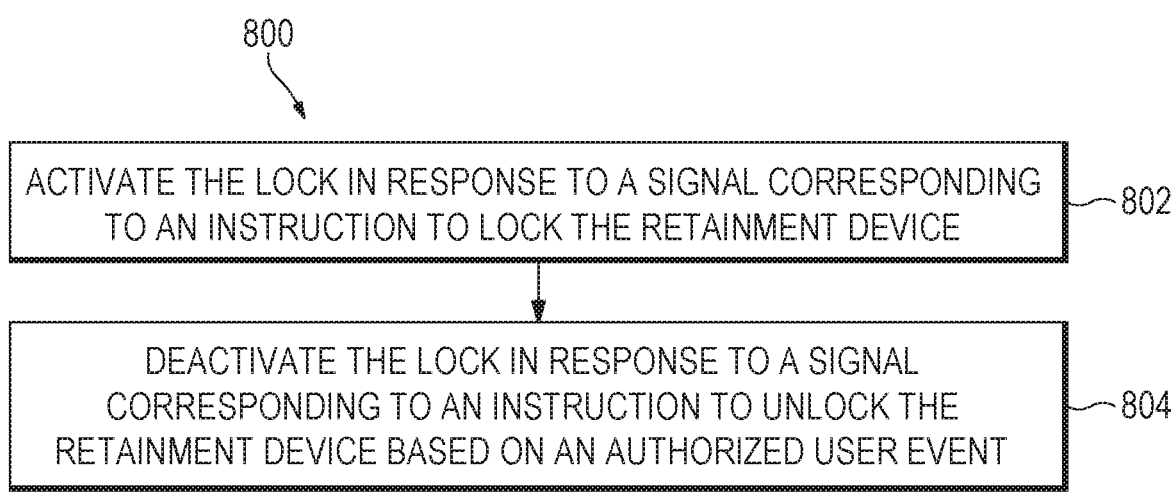
FIGS. 8-9 is a flow diagrams depicting example methods of operating a lock of a headphone hook.

In some examples, the executable instructions may be part of an installation package that when installed may be executed by a processor resource to perform operations of a display device, such as the method 800 described with regards to FIG. 8. In that example, a memory resource may be a portable medium such as a compact disc, a digital video disc, a flash drive, or memory maintained by a computer device, such as a data server, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

Figure 9:
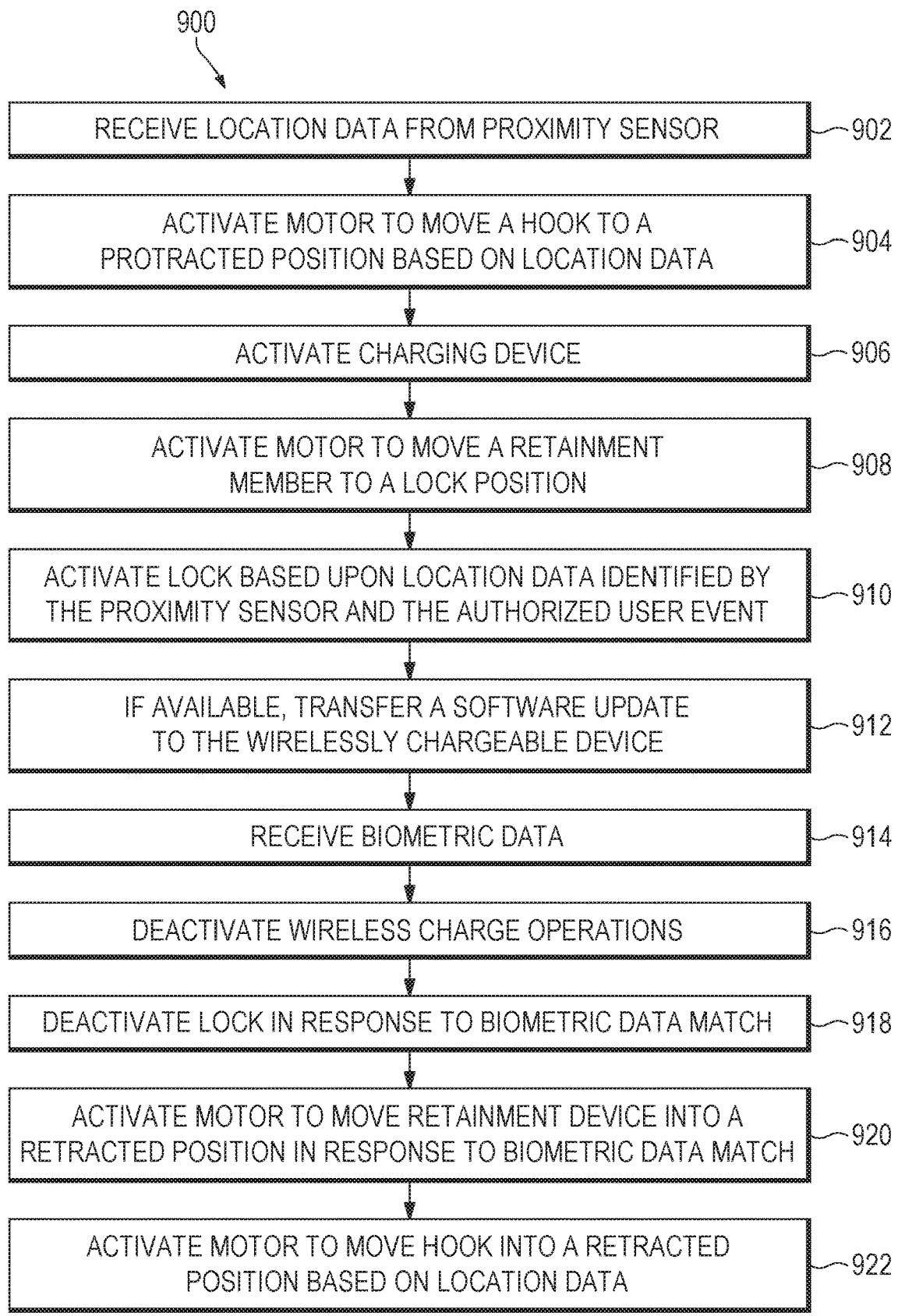

FIGS. 8-9 is a flow diagrams depicting example methods 800 and 900 of operating a lock of a headphone hook. Referring to FIG. 8, the method 800 generally includes activating the lock and deactivating the lock based on receipt of an appropriate signal. At block 802, the lock is activated in response to a signal corresponding to instructions to lock the retainment device. For example, the signal may be received by a controller, such as controller 110 of FIG. 1, where the controller may be configured to determine the signal corresponds to an instruction to lock the retainment device, and then the controller executes instructions to send a signal to activate the lock. At block 804, the lock is deactivated in response to a signal corresponding to an instruction to unlock the retainment device based on an authorized user event. For example, the signal may be received by a controller, such as controller 110 of FIG. 1, where the controller may be configured to determine the signal corresponds to an instruction to unlock the retainment device, and then the controller executes instructions to send a signal to deactivate the lock.

Referring to FIG. 9, the method 900 generally includes receiving data, activating components based on the data received, receiving biometric data, and deactivating components in response to the biometric data. At block 902, location data is received from a proximity sensor. The location data may include distance, global positioning system information, a binary presence detection information, or the like. Components of a system corresponding to a hook may be activated based on the information received by a controller of the system.

At block 904, a motor is activated to move a hook to a protracted position based on the location data. For example, a controller may determine, based on the location data, that a user is near a display device and protract a hook in response to that determination. At block 906, a charging device is activated. This may be based on location data, similar to motor activation of block 904, or may be based on other information or mechanical connection, such as physically connecting a peripheral device to the hook.

At block 908, a motor is activated to move a retainment member into a lock position. This may be in response to placing a peripheral on the hook, in response to a button depression, in response to a voice-command, in response to an authorized user login operation, in response to receipt of authorized payment information, or a like authorized user event. Similar user events may be used to activate a lock at block 910. Indeed, at block 910, a lock is activated based upon location data identified by the proximity sensor and the authorized user event.

Upon activation of the lock, the peripheral may be securely stored on the hook, for example. Once stored, the system or user may perform operations on the peripheral device, such as power charging. For example, at block 912, a transfer of a software update may be sent to a wirelessly chargeable device, if a software update is available from the host system for the wirelessly chargeable device.

At lock 914, biometric data may be received. Authorization may be initiated by receipt of biometric data and matching such biometric data to an authorized user. The lock may remain in a locked stated until an authorized user event occurs, such as receipt of authorized biometric information.

At block 916, any wireless charging operations may be terminated and, at block 918, the lock may be deactivated in response to a match of the biometric data with a user authorized to deactivate the lock. With the lock deactivated, the motor of the retainment mechanism may be activated to move the retainment device into a retracted position in response to the biometric data match at block 920. A wirelessly chargeable device located on the hook surface may be retrievable from the hook with the retainment device moved into a retracted position, for example. At block 922, a motor of the hook may be activated to move the hook into a retracted position based on location data. For example, a controller may receive location data corresponding to the location of a wirelessly chargeable device coupled to the system, determine that the device is no longer placed on the hook based on the location data, and activate the motor to retract the hook due to the hook no longer being in use to sustain the device. Examples of movement of the hook and the retainment device are discussed in more detail with respect to FIGS. 12-14.

Although the flow diagrams of FIGS. 8-9 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description FIGS. 10-11 are isometric views of an example protractible hook 102 having an example lock 108 in various states of operation. A display device 100 may include a housing 112 and a screen 114. The housing 112 may include a cavity 190 in which the protractible hook 102 may be stored. An actuation device, such as a motor, may move the protractible hook 102 from within the cavity 190 to extend externally from the housing 112, such as shown in FIG. 10. Such actuation device may be used to retract the protractible hook 102 back into the cavity 190 of the housing 112 when the hook is no longer used.

The protractible hook 102 of FIG. 10 includes a rest surface 104, a retainment cap 106, and a lock 108. The rest surface 104 may include a portion 180 with particular properties corresponding to a device to be sustained by the hook 102. For example, the portion 180 may be a wireless charging area provided by a charging pad of a charging device coupled to the hook 102. In that example, the charging device may be activatable in response to contact between a lockable end of the retainment device (such as tab 160) and a lockable portion of the hook 102 (such as hole 162). For another example, the portion 180 may include an alignment magnet to maintain the device over the portion 180 of the rest surface 104. In some examples, the retainment cap 106 (or surface 104) may include a magnet having an electromagnetic field capable of sustaining the accessory peripheral on the rest surface as part of the lock 108 as well as alignment. In such an example, a controller may cause the magnet of the retainment cap 106 (or surface 104) to reduce the electromagnetic field in response to an authorized user event (e.g., to allow the peripheral to be removed from the hook 102).

The retainment cap 106 may be coupled to the rest surface 104 via a hinge 170. Indeed, the retainment device may include a rotatable cap 106 coupled to the hook 102 by a hinge 170 at a first end of the rotatable cap 106. The hinge 170 may be spring-loaded to bias the cap 106 into an open position as shown in FIG. 10 to allow a peripheral to be placed on the rest surface 104. Indeed, the retainment cap 106 may be deployed to an unlocked position when the hook 102 reaches a protracted position, such as the position shown in FIG. 10, via a biased spring hinge 170. The retainment cap 106 may include a tab 160 that corresponds to a complementarily-shaped cut-out (or aperture 162) associated with the lock 108. The retainment cap 102 may be rotated along hinge 170 to place the tab 160 into the aperture 162. With the tab 160 place in the locking aperture 162, the lock 108 may activate to lock the retainment cap 106 in the locked positions as shown in FIG. 11. The lock may be a mechanical structure to allow for sustaining the retainment device in a position and, in other examples, the lock may be a combination of circuitry, executable instructions, and a mechanical structure. For example, a controller may control the lock such as when the lock couples to a second end of the rotatable cap when the controller activates the lock. In another example, the retainment cap 106 may be sustained in the lock position by a motor until a timer threshold is reached, such as in a situation where the timer threshold corresponds to a time-based event associated with an authorized user.

The protractible hook may act as a cantilever where the surface 104 of the protractible hook 102 supports a peripheral, such as a headphone device (e.g., headphone device 199 of FIG. 11). In some examples, the surface 104 of the protractible hook 102 may be a headphone receiving area that is curved or oblique with respect to screen 114 or the side wall of the housing 112, such as being a cupped surface or two surfaces that create an angle at which to support a peripheral on the hook 102 from falling off the hook 102.

Referring to FIG. 11, the rotatable retainment cap 106 is rotated to cover a portion of the peripheral headphone device 199. In this manner, the peripheral may be covered by the retainment cap 106 in a first orientation (such as depicted in FIG. 11) and uncovered by the retainment cap 106 in a second orientation (such as depicted in FIG. 10). The headphone device 199 may be able to charge, update software, etc. while locked to the hook 102. For example, the headphones 199 may be wirelessly chargeable and/or wirelessly operable while locked onto the hook 102 by the restraining the retainment cap 106 over the head strap of the headphones 199.

A biometric scanner 140 may be accessible on an exterior of the retainment cap 106 when the retainment cap is in the lock orientation. The biometric scanner 140 may be integrated or remote to the hook 102. Indeed, in some examples, the biometric scanner 140 may be located on the retainment cap 106 as depicted in FIG. 11, and in other examples, the biometric scanner 140 may be located on the housing 112 or on a peripheral attached to the display device 100. The biometric scanner 140 may be powered separate to power provided to the display device 100 (or all-in-one computer system) or may receive power via the hook 102 from the display device 100 (or the all-in-one computer system). The biometric scanner 140 may unlock the lock of the hook 102 in response to an authorized user touching the scanner (e.g., an authorized user event) and may be activated, such as via a controller, to open the retainment cap 106 back to an unlocked orientation, such as the orientation shown with respect to FIG. 10.

Figure 12:
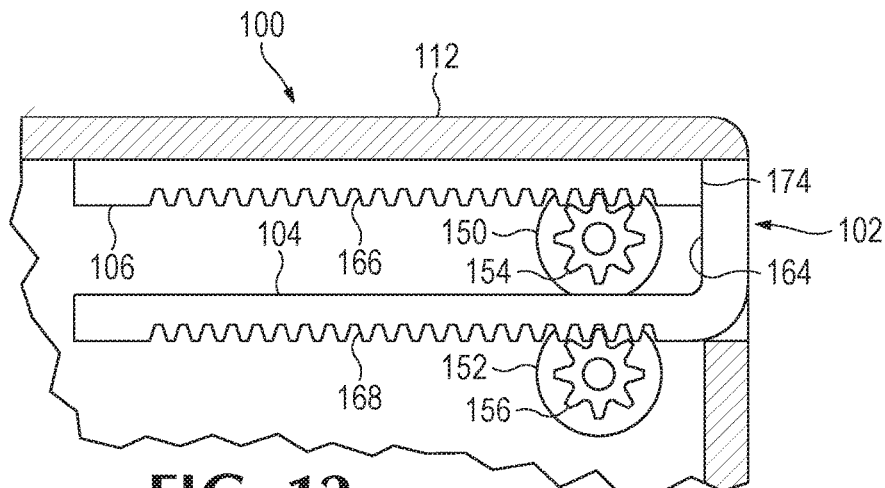
FIGS. 12-14 are sectional views of an example protractible hook in example states of operation.
Figure 13:
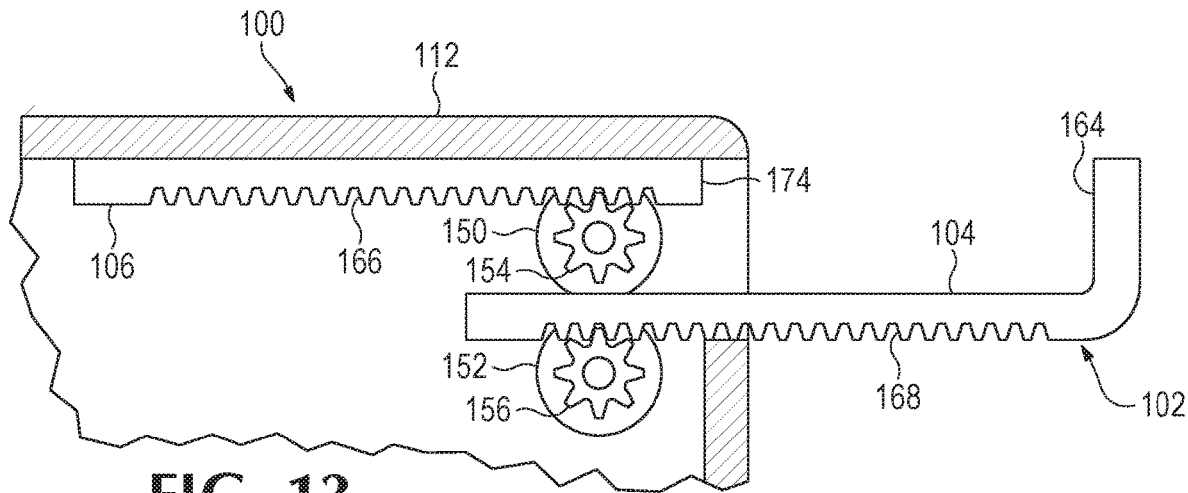
Figure 14:
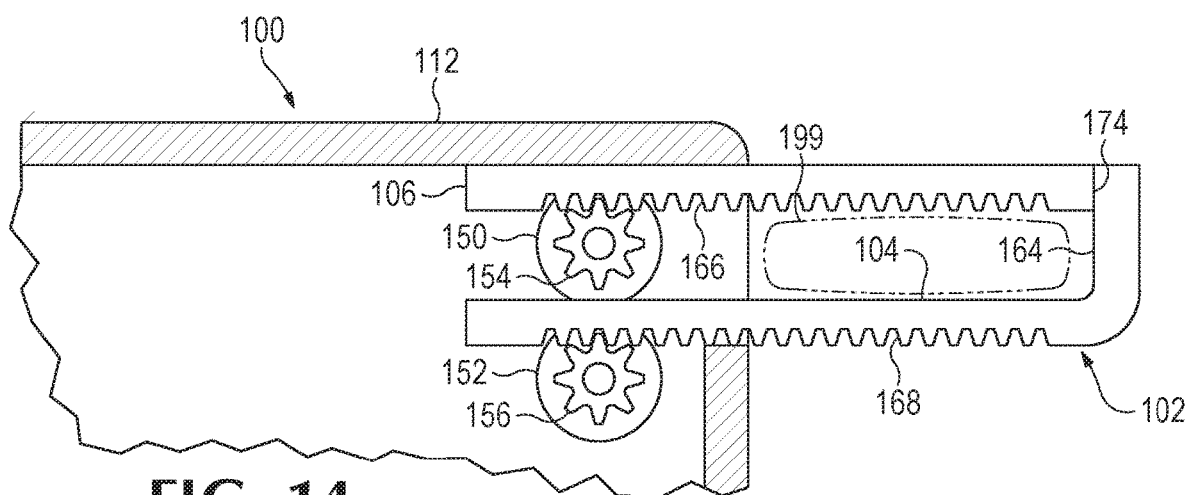

FIGS. 12-14 are sectional views of an example protractible hook 102 in example states of operation. Referring to FIG. 12, the display 100 includes a hook system having a first moveable structure corresponding to a retainment device 106 and a second moveable structure including a resting surface 104. The second moveable structure includes a surface 164 substantially perpendicular to the resting surface 104 to provide a limit for sustaining a peripheral in place while on the hook 102.

The structures 106 and 102 may be moveable via an actuation mechanism, such as springs or pumps. The examples of FIGS. 12-14 use motors to move the hook system structures. Motors 150 and 152 may be coupled to gears 154 and 156 respectively. The gears 154 and 156 may have teeth complementary to the teeth 166 and 168 on the bottom, catching surfaces of the retainment device 106 and the hook 102. In this manner, rotation of the gears may operate movement of the retainment device and/or rest surface.

In the example of FIG. 12, the retainment device 106 and the protractible hook 102 are stowed within the housing of the display 100. The protractible surface of the retainment device 106 and the protractible hook 102 may be independently moveable by a motor, or a plurality of motors such as motors 150 and 152. In the example of FIG. 13, the motor 152 may move the hook 102 to a protracted position external to the housing of the display 100. In this protracted position, the rest surface 104 may be exposed to be used for placing a peripheral device to be sustained by the hook 102.

In the example of FIG. 14, the retainment device 106 is moved, via the motor, gear, and teeth combination, to place the surface 174 against the surface 164 of the hook 102. A peripheral on the resting surface is covered by the retainment device 106 when it is moved to a protracted position. In this manner, the retainment device 106 is sustained in a protracted position that abuts a surface of the hook 102 when in the lock position and the peripheral 199 is locked on the hook 102. The motors may be actuated to retract the retainment device 106 and allow a user to retrieve the peripheral 199. In some examples, the motor 150 maintains the position of the protractible surface in a protracted position until a signal corresponding to the authorized user event is received by a controller, such as a controller that uses biometric data to determines authorized use of the hook 102 is requested. In such examples, the controller may also operate the motor 152 to retract the hook 102 when not in use.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. A headphone hook comprising:
a rest surface to sustain a peripheral;
a retainment device switchable between a lock position that restrains the peripheral to a location of the rest surface and an unlock position that reduces an orientation restriction on the peripheral with respect to the lock position;
a lock coupleable to the retainment device, the lock to maintain the retainment device in the lock position; and
a controller to actuate the lock in response to a user event.

2. The headphone hook of claim 1, further comprising:
a biometric scanner coupled to the controller,
wherein the controller deactivates the lock when data generated by the biometric scanner matches data corresponding to an authorized user.

3. The headphone hook of claim 2, wherein:
the biometric scanner is located on the retainment device;
the rest surface is substantially rectangular;
the retainment device includes a U-shaped cover coupled to a hinge such that, when the cover is rotated to contact the rest surface, a through-hole exists between the cover and the rest surface; and
the through-hole is of a size that a portion of a wirelessly operable electronic device fits in the through-hole.

4. The headphone hook of claim 3, wherein:
the retainment device includes a tab;
the lock includes a side wall forming an aperture into which the tab resides when sufficient pressure is placed in a direction of the rest surface;
the lock couples the retainment device to the rest surface based on the sufficient pressure placed on the retainment device towards the rest surface; and
the controller causes the lock to release the tab from the aperture in the side wall.

5. The display device of claim 1, wherein:
the retainment mechanism includes a magnet having an electromagnetic field capable of sustaining the peripheral on the rest surface; and
the controller causes the retainment mechanism to reduce the electromagnetic field in response to the user event.

6. A display device comprising:
a screen;
a housing around the screen, the housing including a side wall;
a hook coupled to the side wall of the housing;
a retainment device coupleable to the hook;
a lock to maintain the retainment device in a lock position or in an unlocked position; and
a controller to:
activate the lock in response to a signal corresponding to an instruction to lock the retainment device; and
deactivate the lock in response to a signal corresponding to an instruction to unlock the retainment device based on a user event.

7. The display device of claim 6, wherein the retainment device includes a protractible surface.

8. The display device of claim 7, wherein:
the hook is protractible; and
the retainment device deploys to an unlocked position when the hook reaches a protracted position.

9. The display device of claim 8, wherein:
the protractible surface of the retainment device and the protractible hook are independently moveable by a motor; and
the retainment device is sustained in the protracted position that abuts a surface of the hook when in the lock position; and
the motor maintains the position of the protractible surface in a protracted position until a signal corresponding to a user event is received by the controller.

10. The display device of claim 9, further comprising:
a charging device coupled to the hook, wherein
the protractible hook is a cantilever;
the surface of the protractible hook is a headphone receiving area that is curved or oblique with respect to the sidewall of the housing;
the charging device is activatable in response to contact between a lockable end of the retainment device and a lockable portion of the hook; and
the retainment device is sustained by the motor in the lock position until a timer threshold is reached, the timer threshold corresponding to a time-based event corresponding to an authorized user.

11. An all-in-one computer system comprising:
a display;
a housing component coupled to the display, the housing component forming a cavity;
a protractible hook integrated into the housing component, the protractible hook capable of supporting weight of a wirelessly operable device when the protractible hook is in a protracted position;
a retainment device coupleable to the protractible hook, the retainment device including structure to maintain the wirelessly operable device on the hook when the retainment device is in a first orientation;
a lock coupled to the retainment device, the lock to maintain the retainment device in the first orientation when the lock is in an active state; and
a controller to:
activate the lock when the protractible hook is in the protracted position and the retainment device is in the first orientation; and
deactivate the lock in response to an authentication signal corresponding to an authorized user event.

12. The all-in-one computer system of claim 11, comprising:
a combination of circuitry and executable instructions to execute an operating system, wherein
the authentication signal is received via an instruction from:
the operating system;
a mobile application; or
a peripheral coupled to the all-in-one computer system.

13. The all-in-one computer system of claim 12, comprising:
a proximity sensor,
wherein the controller comprises:
a machine-readable medium having a control program stored thereon, the control program to, when executed by the controller, cause:
a motor to move the retainment device into a lock position or an unlock position based on the location data provided by the proximity sensor; and
the lock to activate based upon location data identified by the proximity sensor and the authorized user event.

14. The all-in-one computer system of claim 11, comprising:
a biometric scanner,
wherein the controller deactivates the lock in response to identification of an authorized user by a biometric scanner.

15. The all-in-one computer system of claim 14, wherein:
the retainment device includes a rotatable cap coupled to the hook by a hinge at a first end of the rotatable cap;
the retainment device covers a portion of the wirelessly operable device when in the first orientation;
the biometric scanner is accessible on an exterior of the retainment device when the retainment device is in the first orientation;
the biometric scanner is powered separate to power provided to the all-in-one computer system; and
the lock couples to a second end of the rotatable cap when the controller activates the lock.

* * * * *